Figure 5:
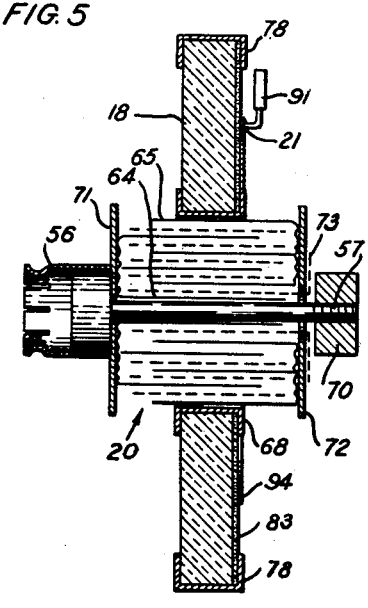

Sept. 12, 1950 E. L. CHATTERTON ET AL 2,521,828
COAXIAL LINE ATTENUATOR
Filed June 25, 1946 2 Sheets-Sheet 1

INVENTORS
E. L. CHATTERTON
J. G. MOORING
BY
W.C. Parnell
ATTORNEY

Sept. 12, 1950
E. L. CHATTERTON ET AL
2,521,828
COAXIAL LINE ATTENUATOR
Filed June 25, 1946
2 Sheets-Sheet 2
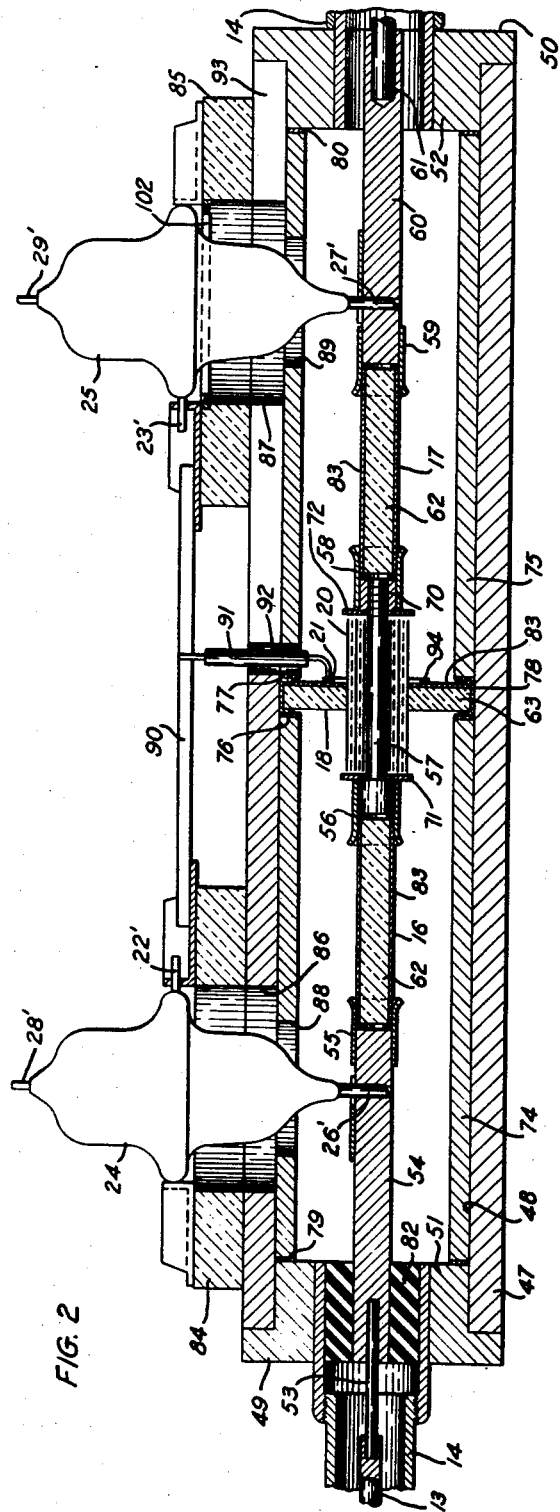
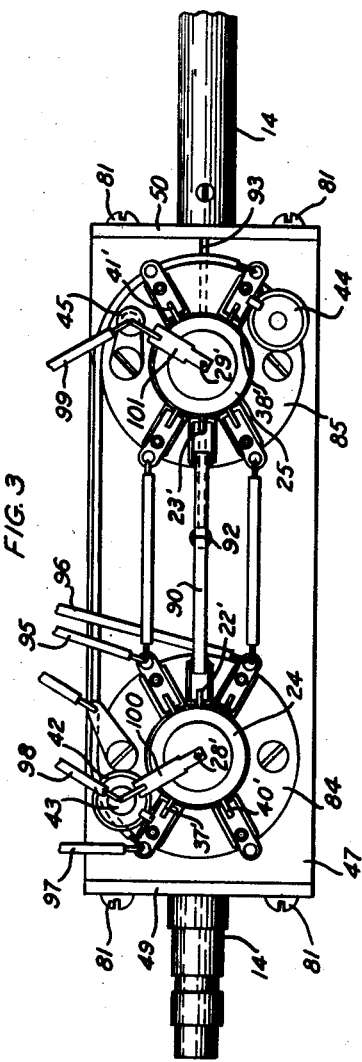
INVENTORS
E. L. CHATTERTON
J. G. MOORING
BY
W. C. Parnell
ATTORNEY Patented Sept. 12, 1950

2,521,828

UNITED STATES PATENT OFFICE 2,521,828

COAXIAL LINE ATTENUATOR

Earl L. Chatterton, Bloomfield, N. J., and John G. Mooring, Pelham Manor, N. Y., assignors to Western Electric Company, Incorporated, New York, N. Y., a corporation of New York Application June 25, 1946, Serial No. 679,068

8 Claims. (Cl. 171—95)

This invention relates to electric meters and particularly to meters for the measurement of power in alternating current circuits.

There are available a number of types of wattmeters capable of measuring quite accurately power being transmitted at low frequencies, but these devices are entirely inadequate for the direct measurement of power at high and ultra high frequencies. For purposes of this discussion it is assumed that high frequencies extend up to 30 megacycles per second, very high frequencies from 30 to 300 megacycle per second, and ultra high frequencies from 300 to 3000 megacycles per second.

In the high frequency bands an accurate measurement of power is complicated by various factors which are of little or no importance in the low frequency band. The inter-electrode capacities of most vacuum tubes and the capacities of resistors and of the necessary connecting leads make most circuits unduly frequency sensitive, and at very short wave lengths special precautions must be observed to eliminate reflection effects which would make the circuit entirely unreliable as a power measuring device.

The magnitude of the voltages which may be applied to the control grids of available vacuum tubes is limited and when used in a high frequency meter, such tubes cannot be associated with high voltage circuits in the usual manner by the use of transformers since the impedance and phase shift of any transformer varies excessively when it is used over a wide high frequency range. Even conventional resistors are no longer pure resistances in the frequency range of present interest, and the whole circuit of any meter to be so used must be designed with due regard to all these and other factors peculiar to this frequency range.

In some cases the circuits used for measuring low frequency power have been of the general type disclosed in Patent 1,586,533 to E. Peterson in which the power is measured in the output of a normally balanced modulator. Potentials proportional to the current to be measured are applied to the individual input circuits of the modulator and a potential approximately equal to the potential at the load is applied to the common portion of the input circuit. In one form of Peterson's meter these potentials are derived from a T-type resistor pad connected between the power source and the load, but the utility of such a meter is inherently limited to cases where the modulator tubes can respond to the full voltage swing of the high frequency source.

It also has been suggested, as for example by Turner and McNamara in "An electronic wattmeter and voltmeter and a phase shifting bridge" in Pro. I. R. E., vol. 18, page 1743, for October 1930 that, in such a low frequency wattmeter, a resistance type potential divider be used in the shunt arm to apply only a fraction of the load potential to the metering circuit. However, this raises the grid biasing battery to a relative high potential above ground which would be very objectionable in a high frequency circuit.

As a result of these and other factors, there is, in so far as applicant is aware, no satisfactory meter available for the direct measurement of high frequency power. In current practice such power is measured indirectly by dissipating it and measuring the power in terms of the heat or light so produced. Obviously, such methods are not applicable where a continuing indication or a record is desired of the actual power transmitted and supplied to a useful load.

The object of this invention is to measure power directly and accurately at these higher frequencies.

According to the invention such power is measured by an electronic meter having a circuit of the basic type proposed by Peterson for low frequency applications, but in which the high frequency voltages and currents are confined to limited areas of the apparatus. The actuating voltages for the meter are derived from a resistance network which is designed as a T-type attenuator to eliminate reflections and which is made up of resistors which are not frequency sensitive. The modulator tubes are of a special high frequency type in which the control grid lead is isolated from the other electrodes' leads and they are carefully selected for matched linear trans-conductance over a wide range of control grid voltage.

The meter is made applicable to high voltage circuits by tapping the shunt resistor of the attenuator at an appropriate point for a cathode connection. To keep the cathode bias independent of source or load resistance, the shunt resistor is connected to the high potential side of the attenuator through a condenser. With such a modified network it then becomes possible to eliminate entirely the usual grid battery and to apply static bias to the cathodes by designing the attenuator so that the low potential portion of the shunt resistor serves also as a self-biasing means.

In the preferred structure as applied to the measurement of power being transmitted over a coaxial cable, the attenuator is serially connected in the cable and housed in a grounded metal casing or head which is apertured to receive the tubes of the modulator at positions so spaced that the grid leads of the tubes connect directly with the respective ends of the series resistors in the attenuators. The condenser required for the shunt arm is of a special spirally wound type mounted in a central opening of a disc type resistor constituting the resistance element of the shunt arm.

Figure 4:
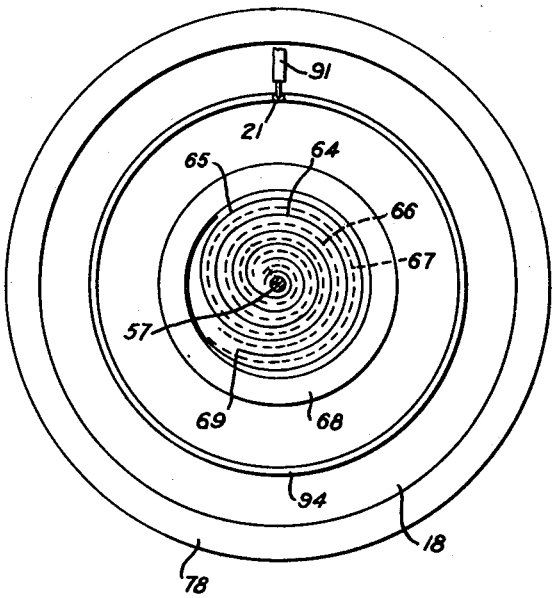
Figure 1:
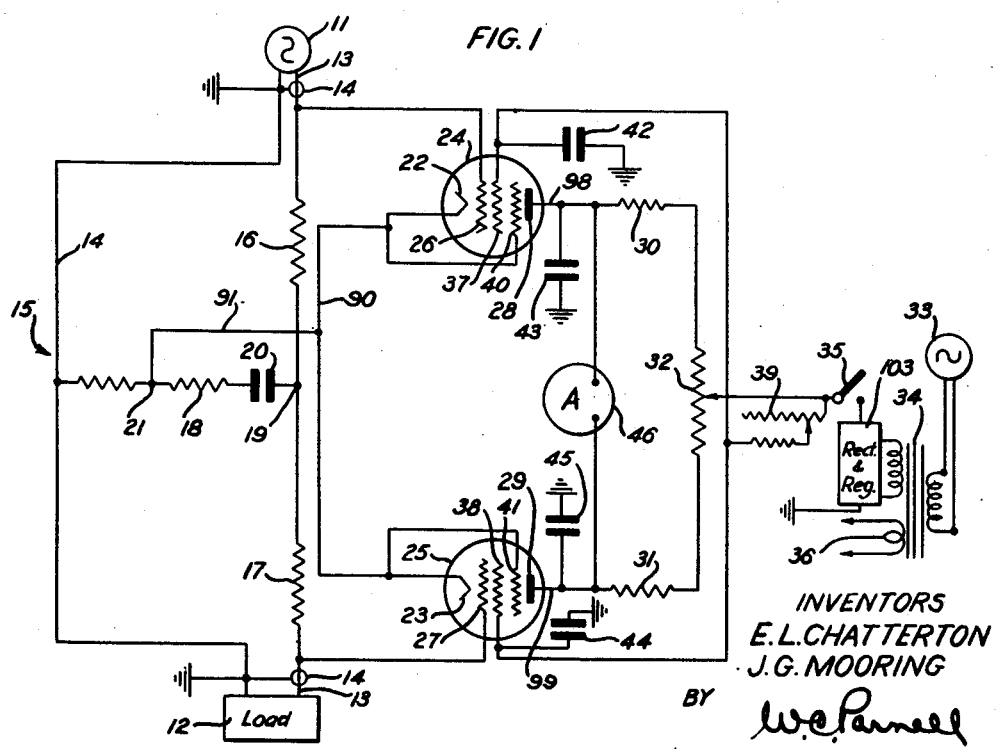

In the drawing Fig. 1 is a circuit diagram of a meter according to the invention, Figs. 2 and 3 are an enlarged sectional view and a plan view, respectively, showing the mechanical structure of the meter, and Figs. 4 and 5 are enlarged detailed views of the disc resistor and condenser assembly shown in Fig. 2.

Referring to Fig. 1 of the drawing, high frequency power from the source 11 is supplied to the load 12 over a coaxial cable comprising a conductor 13 coaxially disposed within a grounded shield 14 as indicated. The network 15 interposed between the source and the load is basically a standard T-type attenuator with identical series resistors 16 and 17 and a shunt resistor 18. In this case, however, the shut resistor is connected to the junction 19 between the series resistors through a condenser 20 and the resistor is tapped at an intermediate point 21 for connection to the cathodes 22 and 23 of the tubes 24 and 25.

It will be noted that in this circuit the portion of resistor 18 which extends between point 21 and the grounded conductor 15 is in the plate return circuits of the tubes. Hence, the plate currents in passing through that portion of the resistor set up therein a static potential drop which is applied as a positive bias to the cathodes 22 and 23. Since the grids 26 and 27 are grounded through the impedances of the source 11 and the load 12, they are statically at ground potential and therefore negatively biased with respect to the cathodes without the bias battery used in previous meters of this general type. Due to the presence of condenser 20 in the shunt arm of the attenuator, no part of the direct components of the plate currents of the tubes 24 and 25 is present in the source 11 or the load 12, and the static bias applied to the tubes therefore is not affected by variations in impedance of the source or of the load.

The power potential from the source 11 existing between point 19 and the grounded conductor 15 is divided between the two parts of resistor 18 and the condenser 20. As the grids are connected to the point 19 through low resistors 16 and 17 and the cathodes are connected directly to point 21, the portions of the power potential existing between these points is applied to the input circuits of both tubes.

The tubes are of a high frequency type such as those known commercially as No. 954 with their control grids 26 and 27 connected to the source and load ends of the resistors 16 and 17, respectively, and their plates 28 and 29 connected together through resistors 30, 31 and a balancing potentiometer 32.

Power for operating the meter is supplied from an alternating current source 33 through a transformer 34, a suitable rectifying and regulating unit 103, and a control switch 35 to the potentiometer 32 which is adjusted for an accurate balance of the plate currents of the tubes when no input is supplied to the grids. Current for the heaters (not shown) of the tubes is obtained in the usual manner from a winding 36 of the transformer and the potential of the screen grids 37, 38 is set at the proper value by the adjustable resistor 39. The suppressor grids 40 and 41 are connected directly to their respective cathodes and the high frequency potentials on the screens and plates are by-passed to ground by condensers 42, 43 and 44, 45, respectively. As will be explained in more detail below, power transmitted from the source to the load is indicated directly by the micro-ammeter 46 connected between the plates of the tubes.

In the structural views of the meter head shown in Figs. 2 and 3, the circuit elements are numbered as in Fig. 1 and the terminals of the tubes 24 and 25 are identified by primed numbers corresponding to the tube electrodes. The casing 47 of the head is preferably a block of metal such as aluminum with a longitudinal bore 48 extending throughout its length but closed at its end to form a cylindrical chamber by rectangular plates 49 and 50 having cylindrical bosses 51 and 52 extending into the chamber as shown. The coaxial conductor 13 is extended through the head over a coaxial path including a pin 53 engaging a socket in a rod 54 mounted in an insulating bushing 82, a connector 55, the resistor 16, a connector 56, the terminal bolt 57 of the condenser 20, a connector 58, the resistor 17, a connector 59, a rod 60 (similar to the rod 54), and a pin 61 associated with the load portion of the cable 13. While the resistors 16, 17, and 18 theoretically may be of any type which is not frequency sensitive so that their impedances are constant over a whole frequency range of interest, it is convenient to use the known high frequency attenuator structure as disclosed for example in Fig. 1 of Patent 1,957,538 to Jensen in which the series resistors are of the rod type and the shunt resistor is a disc as shown. In each case the body 62 or 63 is of ceramic material and the resistance element consists of a coating 83 of carbon deposited on the ceramic to the thickness required.

For the purposes of the present invention, the disc resistor 18 is modified by providing it with an enlarged central opening for receiving the condenser 20. One terminal of this condenser must be connected to both of the series resistors 16 and 17 and the other terminal must be connected to the high potential end of the shunt resistor 18, and these requirements are met in a very compact structure without altering the basic design of the attenuator by spirally winding tinfoil and insulation, such as strips of cellulose acetate, around the axially disposed bolt 57. In Figs. 2, 4, and 5 only a few of the turns of the condenser are indicated and these are drawn with an exaggerated spacing to show clearly the method of construction. Two strips 64, 65 of foil are interleaved with two strips 66, 67 of insulation with the strip 64 wound first around the bolt 57 to establish electrical contact therwith and then extending spirally outward between the insulating strips 66 and 67 to terminate at a point 69 short of the ends of these strips. The strip 65 begins near the bolt 57 but is insulated therefrom by the strips 66 and 67 and extends spirally outwardly to a point beyond the ends of the strips where it overlays the preceding turn and forms a cylindrical surface in intimate electrical contact with the silver layer 68 around the central opening of the resistor 18.

The two foil strips are wound in staggered relation to each other so that the convolutions of strip 64 protrude to the left beyond the insulating strips while the convolutions of the strip 65 protrude beyond these strips to the right as indicated in Fig. 5. In the assembly of the condenser unit the tightening of the nut 70 on the bolt 57 to secure the connectors 56 and 58 also forces the metal washers 71 and 72 against the protruding edges of the foils pressing them inwardly and together into good electrical contact with each other. The washer 71 is in electrical contact with the connector 56 but the washer 72 has a larger central hole and is insulated from the bolt and other components of the coaxial line by the insulating material 73. The foils 64 and 65 are therefore conductively connected only to the series and shunt resistors, respectively, of the coaxial system as required by the diagram of Fig. 1, and since the edges of adjacent convolutions of each foil are in electrical contact with each other, there is a short current path to each convolution and the effective resistance of the condenser is kept very low.

The resistance-condenser of the assembly just described and the series resistors 16 and 17 are held in place mechanically and in proper electrical contact by metallic cylindrical sleeves 74, 75 which are a slide fit in the bore 48 of the casing 47. Between their adjacent inner ends and the disc resistor 18, spring washers 76, 77 are provided to insure good electrical contact with the outer silver ring 78 on the resistor. Similar spring washers 79, 80 are disposed on the other ends of the sleeves so that when the screws 81 of the end plates 49 and 50 are in place, the whole chamber assembly is tightly secured together with the sleeves 74 and 75 effectively constituting a portion of the grounded outer shield 14 of the coaxial system. In accordance with the usual practice, the sleeves, connectors, washers, and all other current carrying parts are suitably plated, as for example with gold, to keep their resistance low.

The tubes 24 and 25 are mounted in conventional sockets 84 and 85 secured to the casing 47 so that the lower portions of the tubes extend downwardly through circular openings 86 and 87 in the casing and openings 88 and 89 in the sleeves 74 and 75 with the control grid terminals 26' and 27' engaging small clips in vertical holes located in the rods 54 and 60 near the ends of the resistors 16 and 17. The cathode terminals 22' and 23' are connected together by a bar 90 which is spaced away from the casing 47 to reduce capacity effects to a minimum. This bar is connected to the intermediate point 21 on the resistor 18 by a short conductor 91 extending through a hole 92 which lies at the inner end of a slot 93 provided to admit the conductor 91 when the resistor is inserted in the casing from the right. In order to fix the value of the two portions of the resistor 18 accurately at the desired values, the resistor is made up with an excess of carbon and a narrow ring 94 of silver is applied at a suitable intermediate radius. The conductor 91 is then attached to the ring as shown in Fig. 4 and the excess carbon removed until each component of the resistor is increased to the proper value.

In Fig. 3 the external connections to the power supply and meter have been omitted but it will be readily understood that heater current is supplied through conductors 95 and 96, screen potential over conductor 97 and plate potential over conductors 98 and 99 and the removable clips 100 and 101. The suppressor grids are connected to the cathodes by conductors such as 102 disposed within the sockets 84 and 85 as shown in Fig. 2 for the tube 25.

Since this meter functions basically in the same general manner as Peterson's low frequency meter referred to above, no detailed explanation is required. It is important, however, that the head be designed in accordance with the best practice for the design of high frequency attenuators and with a characteristic impedance equal to those of the source and the load so that all reflections are avoided. When this is done and the necessary modifications are made in the manner described, the essential nature of the network is unchanged and the meter may be calibrated to give an accurate indication of the power delivered to the load.

In one instance such a meter was developed to measure power over a frequency range from 10 megacycles per second to the upper frequency limit imposed by the vacuum tube, using a coaxial line having a characteristic impedance of 75 ohms. In that case the resistors 16 and 17 were each of 5 ohms resistance, the resistor 18 and condenser 20 were designed to give a resistance of 566 ohms, and the point 21 was located 510 ohms above ground to apply $\frac{1}{10}$ of the line voltage to the cathodes of the tubes and to provide the required grid bias. For the above frequency range the condenser may be of .002 microfarad capacity, and with the construction described above it is possible to build such a condenser to fit into the necessarily small space.

When power is being transmitted, the input circuits are actuated by a voltage proportional to the line voltage and also by voltages proportional to the potential drops in the resistors 16 and 17, respectively, but since the latter potential drops are applied in opposite senses to the two tubes, the normally balanced output circuit is unbalanced in proportion to the power delivered to the load and this power is indicated directly by the meter 46. In this case the attenuator is designed for equal sensitivity for current and voltage changes to give true wattmeter action, but it will be readily understood that such a meter may be converted to read current or voltage only merely by changing the attenuator constants to give the circuit relatively high sensitivity to either current or voltage changes as desired.

While, as stated above, the wattmeter is designed for use in a 75 ohm line, where its insertion loss is only about 2 db., it may be used in lines of other characteristic impedances without excessive internal loss. However, due to the limited range of linear transconductance of available vacuum tubes, such use will result in a progressive decrease in the power range over which the meter is accurate. It also will be understood that any impedance mis-match will produce corresponding reflection losses in the line. For greatest accuracy it is therefore desirable to use a given head only at the impedance level and over the power range for which it is designed and to provide other heads for other impedance levels and power ranges as required.

It is, of course, possible to modify the head shown for use with a drum attenuator of the type shown in the Jensen patent so that the range of the meter may be changed merely by rotating the drum. In any case, the output resistors, the meter, the power supply circuits and controls can be made up as a separate unit and this unit may be used in connection either with a drum type attenuator head or selectively with any number of other heads designed for specific ranges.

What is claimed is:

1. In a wattmeter, the combination with a T-type resistance network for insertion in a circuit in which power is to be measured, a pair of vacuum tubes having input and output circuits including anodes and cathodes and control grids connected to opposite ends of the series arm of the network, and means associated with the anodes for indicating the power transmitted through the network, of a connection from both cathodes to an intermediate point on the shunt resistor of the network and a condenser interposed between the shunt and series resistors of the network.

2. In a wattmeter, the combination with a T-type resistance network for connection between a power source and a load, a pair of vacuum tubes having input and output circuits including anodes and cathodes and control grids connected to opposite ends of the series arm of the network, means associated with the anodes for indicating the power transmitted through the network and a connection from both cathodes to an intermediate point on the shunt resistor of the network to apply static potential and a portion of the power potential to the input circuits, of a condenser interposed between the shunt and series resistors of the network for making the static potential independent of the impedances of the power source and the load.

3. A coaxial attenuator comprising a housing of conductive material having a longitudinal bore, two serially connected resistors coaxially disposed within the bore of the housing, a centrally apertured conductive disc disposed transversely of the bore between the resistors with its periphery electrically connected to the housing and a condenser mounted within the aperture of the disc and electrically connected between the junction of the serially connected resistors and the disc at the periphery of the aperture.

4. A coaxial attenuator comprising a housing of conductive material having a longitudinal bore, two serially connected resistors coaxially disposed within the bore of the housing, and a connection, including a disc resistor, between the junction of the two resistors and the housing, said housing having two openings adjacent the opposite ends of the serially connected resistors for receiving vacuum tubes for connection to the resistors.

5. A coaxial attenuator comprising a housing of conductive material having a longitudinal bore and two resistors coaxially mounted with respect to the bore of the housing and a shunt arm in the housing comprising an apertured disc resistor peripherally connected to the housing and having a conductive ring at an intermediate radius for the attachment of a conductor to the resistor, and a condenser having a coaxially mounted inner terminal forming a connection between the two coaxially mounted resistors and an outer terminal conductively connected to the disc at the periphery of the aperture.

6. A coaxial attenuator for use with a meter to measure power transmitted over a coaxial line, comprising a housing of conductive material having a longitudinal bore, two serially connected resistors coaxially disposed within the bore of the housing, a centrally apertured conductive disc disposed transversely of the bore between the resistors with its periphery electrically connected to the housing and a condenser mounted within the aperture of the disc and electrically connected between the junction of the serially connected resistors and the disc at the periphery of the aperture.

7. A coaxial attenuator for use with a meter to measure power transmitted over a coaxial line comprising a housing of conductive material having a longitudinal bore, two serially connected resistors coaxially disposed within the bore of the housing, and a connection, including a disc resistor, between the junction of the two resistors and the housing, said housing having two openings adjacent the opposite ends of the serially connected resistors for receiving vacuum tubes for connection to the resistors.

8. A coaxial attenuator for use with a meter to measure power transmitted over a coaxial line comprising a housing of conductive material having a longitudinal bore and two resistors coaxially mounted with respect to the bore of the housing and a shunt arm in the housing comprising an apertured disc resistor peripherally connected to the housing and having a conductive ring at an intermediate radius for the attachment of a conductor to the resistor, and a condenser having a coaxially mounted inner terminal forming a connection between the two coaxially mounted resistors and an outer terminal conductively connected to the disc at the periphery of the aperture.

EARL L. CHATTERTON.
JOHN G. MOORING.

REFERENCES CITED

The following references are of record in the file of this patent:

UNITED STATES PATENTS

| Number | Name | Date |
| --- | --- | --- |
| 1,586,533 | Peterson | June 1, 1926 |
| 1,905,353 | Potter | Apr. 25, 1933 |
| 1,957,538 | Jensen | May 8, 1934 |
| 2,226,238 | Doba | Dec. 24, 1940 |
| 2,242,874 | Usselman | May 20, 1941 |
| 2,416,694 | Howard, Jr. | Mar. 4, 1947 |